United States Patent
Elwood et al.

(10) Patent No.: US 6,851,265 B2
(45) Date of Patent: Feb. 8, 2005

(54) STEAM COOLING CONTROL FOR A COMBINED CYCLE POWER PLANT

(75) Inventors: David Elwood, Oviedo, FL (US); Brad A. Steinebronn, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 73 days.

(21) Appl. No.: 10/368,217

(22) Filed: Feb. 18, 2003

(65) Prior Publication Data

US 2003/0154721 A1 Aug. 21, 2003

Related U.S. Application Data

(60) Provisional application No. 60/357,953, filed on Feb. 19, 2002.

(51) Int. Cl.[7] ............................... F02C 6/00; F02C 7/16
(52) U.S. Cl. ....................... 60/772; 60/39.182; 122/7 B
(58) Field of Search ............................. 60/772, 39.182; 122/7 R, 7 B

(56) References Cited

U.S. PATENT DOCUMENTS

| | | | |
|---|---|---|---|
| 4,793,132 A | * 12/1988 | Okabe ...................... 60/39.182 |
| 4,932,204 A | 6/1990 | Pavel et al. |
| 5,253,976 A | 10/1993 | Cunha |
| 5,255,505 A | 10/1993 | Cloyd et al. |
| 5,412,937 A | 5/1995 | Tomlinson et al. |
| 5,428,950 A | 7/1995 | Tomlinson et al. |
| RE36,497 E | 1/2000 | Tomlinson |
| 6,105,362 A | 8/2000 | Ohtomo et al. |
| 6,145,295 A | 11/2000 | Donovan et al. |
| 6,205,762 B1 | 3/2001 | Uematsu et al. |
| 6,279,308 B1 | 8/2001 | Sonoda et al. |
| 6,286,297 B1 | 9/2001 | Wakazono et al. |
| 6,293,088 B1 | 9/2001 | Moore et al. |
| 6,324,829 B1 | 12/2001 | Kita et al. |
| 6,338,241 B1 * | 1/2002 | Shibuya et al. .......... 60/39.182 |
| 6,339,926 B1 * | 1/2002 | Ichiro et al. ............. 60/39.182 |
| 6,393,822 B2 | 5/2002 | Nagashima |
| 6,438,939 B1 | 8/2002 | Uematsu et al. |
| 6,651,440 B2 * | 11/2003 | Tanaka et al. ................ 60/772 |
| 6,666,028 B2 * | 12/2003 | Taguchi et al. ............... 60/772 |

* cited by examiner

Primary Examiner—Ted Kim

(57) ABSTRACT

A component cooling steam flow control scheme for a combined cycle power plant (12). Steam pressure in the steam drum (40) of a waste heat recovery steam generator (36) is controlled by selectively positioning a steam bypass valve (54). The flow of steam from the steam drum through a cooling steam flow path (46) is controlled by selectively positioning a steam admission valve (50) in the cooling steam flow path. At power levels below a predetermined crossover power level (72), the cooling steam flow is controlled independently from the steam drum pressure, thus assuring good system controllability at the lower power levels where system control is historically a concern. The steam admission valve is maintained fully open at power levels above the crossover power level, so changes in cooling steam flow at these higher power levels are accomplished by regulating steam drum pressure. System efficiency losses resulting from pressure drop across the steam admission valve are thus minimized at the higher power levels where system efficiency is historically a concern.

16 Claims, 2 Drawing Sheets

STEAM COOLING CONTROL FOR A COMBINED CYCLE POWER PLANT

This application claims benefit of the Feb. 19, 2002, filing date of U.S. provisional patent application No. 60/357,953.

FIELD OF THE INVENTION

This invention relates generally to the field of combined cycle power plants having a combustion turbine system that produces electricity and hot exhaust gas, a waste heat recovery steam generator that uses heat from the hot exhaust gas to produce steam, and a steam turbine system that uses the steam to produce additional electricity. The invention relates more particularly to a combined cycle power plant wherein the gas turbine system includes a component that is cooled with a portion of the steam produced by the waste heat recovery steam generator. The invention relates in particular to a method and apparatus for controlling the delivery of the steam from the steam generator to the component being cooled in a manner that minimizes instabilities in the steam system while maximizing the overall efficiency of the plant.

BACKGROUND OF THE INVENTION

Combined cycle power plants are known in the art as an efficient means for converting fossil fuels to thermal, mechanical and/or electrical energy. Such systems are described in U.S. Pat. Nos. 4,932,204 dated Jun. 12, 1990, and U.S. Pat. No. 6,145,295 dated Nov. 14, 2000, both incorporated by reference herein.

It is also known in the art to cool selected combustion turbine parts with a cooling fluid. One such cooling fluid may be a portion of the compressed air produced by the compressor of the combustion turbine system. As firing temperatures have increased in order to improve the efficiency of combustion turbines, it has become desirable to use steam produced in the waste heat recovery steam generator of a combined cycle power plant as the cooling fluid for the gas turbine components, since steam has a higher heat transfer capacity than compressed air. Compressed air is used as the cooling fluid during the initial start-up of the plant until an adequate steam supply becomes available, at which time the cooling path is switched to steam flow. A portion of the steam produced in an intermediate pressure section of the waste heat recovery steam generator is typically used to provide this cooling flow. The temperature of the cooling steam will increase as it removes heat from the component being cooled. The steam is then directed to an intermediate pressure steam turbine where the heat energy is converted to mechanical energy. A second portion of the steam produced in the intermediate pressure section of the waste heat recovery steam generator is routed to the intermediate pressure steam turbine through a re-heater section of the waste heat recovery steam generator. There is an interaction between these two steam flows since they are both produced together in the intermediate pressure section of the waste heat recovery steam generator and they are delivered together to the intermediate pressure turbine.

As the power level increases during the start-up of a combined cycle power plant, the rate of flow of steam used for cooling the gas turbine components must be increased to accommodate the increasing combustion firing temperature. The pressure in the intermediate pressure section of the waste heat recovery steam generator is controlled as a function of power level to ensure that adequate steam pressure is available to drive the desired flow of cooling steam. A steam bypass valve is used to control the pressure in the steam drum by controlling the amount of steam flowing through the re-heater to the intermediate pressure turbine. However, changes in steam drum pressure demanded for the purpose of controlling the rate of flow of steam through the cooling circuit will affect the level of the water/steam interface in the steam drum. This can lead to unstable operation, especially at low power levels.

In order to provide the required cooling steam flow control while maintaining an adequate degree of steam drum pressure/level control, it is known in the art to provide a separate steam admission valve in the cooling steam flow circuit for controlling the flow rate of steam through the cooling circuit. Thus, steam drum pressure is controlled by selectively positioning the steam bypass valve, and steam cooling circuit flow rate is controlled by selectively and independently positioning the steam admission valve.

FIG. 3 illustrates the relationship between steam drum pressure and gas turbine power level for a prior art combined cycle power plant. Curve 100 is a cooling loop demand pressure curve representing the pressure required in the steam drum to produce the desired amount of cooling steam flow through the cooling circuit as a function of gas turbine power level. The absolute values assigned to points on this curve are plant specific, so curve 100 is provided without measuring units for illustration purposes. In order to ensure that this cooling steam flow demand can be satisfied, and in order to avoid steam system control problems, a bypass valve pressure control curve 102 is developed to control the steam drum pressure to a value that exceeds the demand value of curve 100 at all power levels. The pressure difference 104 between these curves 100 and 102 represents the amount of pressure loss that must be generated across the steam admission valve in order to produce the desired cooling steam flow rate.

SUMMARY OF THE INVENTION

A method is described herein for controlling steam flows in a combined cycle power plant having a heat recovery steam generator, an auxiliary steam circuit including a steam admission valve receiving a first flow of steam from the steam generator, and a steam bypass circuit including a steam bypass valve receiving a second flow of steam from the steam generator, the method comprising controlling pressure in the steam generator as a function of gas turbine power to a value that results in the steam admission valve being at least partially closed at power levels below a crossover power level and that results in the steam admission valve being fully opened at power levels above the crossover power level. The crossover power level may be selected to be at least 70% power.

A method of controlling delivery of steam from a steam drum of a heat recovery steam generator in a combined cycle power plant is described herein as including: providing a cooling steam flow path between the steam drum and a downstream location passing through a heat exchange passage, the cooling steam flow path comprising a steam admission valve; providing a steam bypass flow path between the steam drum and the downstream location not passing through the heat exchange passage, the steam bypass flow path comprising a steam bypass valve; controlling flow rate of steam through the cooling steam flow path by partially closing the steam admission valve at power levels below a crossover power level; maintaining the steam admission valve in a full open position at power levels above the crossover power level; and controlling flow rate of steam through the cooling steam flow path by selectively positioning the steam bypass valve at power levels above the crossover power level.

A method for controlling steam flows in a combined cycle power plant comprising a heat recovery steam generator for generating steam, a component cooling circuit including a steam admission valve receiving a flow of cooling steam from the steam generator, and a steam bypass circuit including a steam bypass valve receiving a flow of bypass steam from the steam generator is described herein as including: selecting a cooling circuit demand pressure curve defining a relationship between power level and steam pressure in the steam generator necessary to produce a desired cooling steam flow rate in the component cooling circuit; selecting a steam bypass valve pressure curve that intersects the cooling circuit demand pressure curve at a crossover point below 100% power; controlling the steam admission valve in response to the cooling circuit demand pressure curve; controlling the steam bypass valve in response to the bypass valve pressure curve at power levels up to the crossover point, thus resulting in the steam admission valve being controlled to a full open position at the crossover point; and controlling the steam bypass valve in response to the cooling circuit demand pressure curve at power levels above the crossover point.

A method for controlling steam flows in a combined cycle power plant comprising a heat recovery steam generator, a component cooling circuit including a steam admission valve receiving a flow of cooling steam from the steam generator, and a steam bypass circuit including a steam bypass valve receiving a flow of bypass steam from the steam generator is described herein as including: selecting a demand value for the steam bypass valve necessary to control steam pressure in the steam generator to a predetermined value as a function of power level: selecting a demand value for the steam admission valve necessary to provide a required cooling steam flow as a function of power level; and if the required cooling steam flow is not achievable with the steam admission valve fully open, then determining a flow compensator value for combination with the demand value for the steam bypass valve that results in a steam generator pressure sufficient to produce the required cooling steam flow with the steam admission valve fully open.

A method for controlling steam flows in a combined cycle power plant having a gas turbine, a heat recovery boiler, an auxiliary steam circuit including a steam admission control valve receiving a first flow of steam from the boiler, and a steam bypass circuit including a steam bypass control valve receiving a second flow of steam from the boiler is described herein as including: at power levels below a predetermined value below 100% power, controlling steam bypass control valve position to produce steam pressure in the boiler in excess of a pressure required to produce a desired steam flow value through the auxiliary steam circuit with the steam admission control valve fully open, and controlling steam admission control valve position to a partially closed position to control steam flow through the auxiliary steam circuit to the desired value; and at power levels above the predetermined value, controlling steam bypass control valve position to produce steam pressure in the boiler to a pressure required to produce the desired steam flow value through the auxiliary steam circuit with the steam admission control valve fully open, and controlling steam bypass control valve position to a fully open position.

BRIEF DESCRIPTION OF THE DRAWINGS

These and other advantages of the invention will be more apparent from the following description in view of the drawings that show.

DETAILED DESCRIPTION OF THE INVENTION

Figure 1:
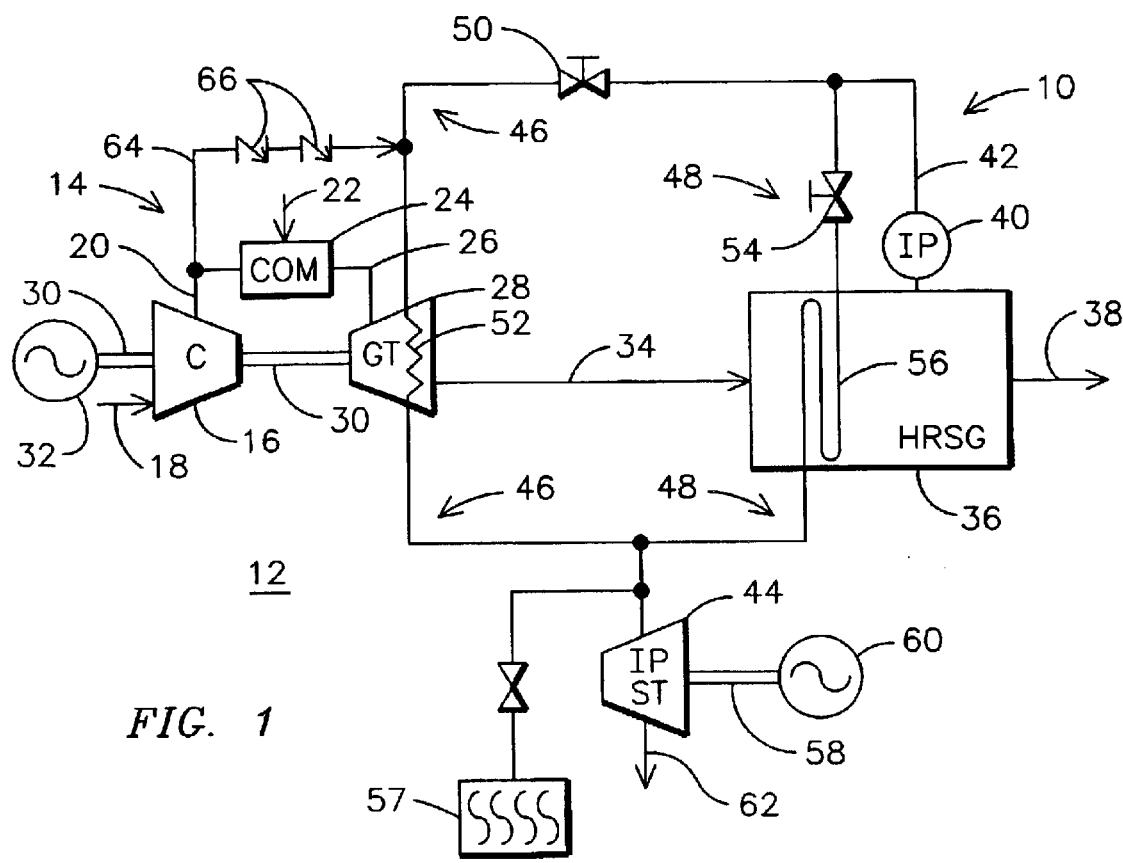
FIG. 1 is a partial schematic illustration of a combined cycle power plant.

FIG. 1 illustrates a portion of the steam flow path 10 of a combined cycle power plant 12. The plant 12 includes a combustion turbine system 14 having a compressor 16 for receiving ambient air 18 and producing a flow of compressed air 20. The compressed air 20 is combined with a flow of fuel 22 in a combustor 24 to produce a flow of hot combustion gas 26. The hot combustion gas 26 is expanded in a gas turbine 28 to produce mechanical energy for rotating shaft 30. Shaft 30 drives both the compressor 16 and an electrical generator 32 that produces electricity. The expanded combustion gas 34 exits the gas turbine 28 and is directed to a waste heat recovery boiler 36, also commonly referred to as a heat recovery steam generator or HRSG. Additional heat is removed from the expanded combustion gas 34 by the boiler 36 before the cooled exhaust gas 38 is exhausted to the atmosphere.

A typical HRSG 36 may include several stages producing steam at various temperatures and pressures in the steam drums of the respective stages. The highest temperatures/pressures are produced proximate the inlet of the hot exhaust gas 34 and the lowest temperatures/pressures are produced proximate the outlet of the exhaust gas 38. An intermediate stage steam drum 40 produces an intermediate energy steam flow 42 that is delivered to an intermediate pressure steam turbine 44 through two alternative flow paths, a cooling steam flow path 46 and a re-heat steam flow path 48. The cooling steam flow path 46 includes a steam admission valve 50 and cooling passages 52 formed within the gas turbine component to be cooled. The re-heat steam flow path 48 includes a steam bypass valve 54 and the re-heater section 56 of the HRSG 36. These recombined steam flows are dumped to a condenser 57 or they are expanded through the intermediate pressure steam turbine 44 to produce mechanical energy for rotating shaft 58 and electrical generator 60 for producing additional electricity. One may appreciate that other arrangements of turbines, shafts and generators may be used in various combinations without departing from the invention as described herein. The exhaust steam 62 exiting the intermediate pressure turbine 44 may be recycled through additional stages of re-heat and turbine expansion before being directed to the condenser 57.

The combined cycle power plant 12 also includes a flow of compressed air 64 taken from the compressor 16 and delivered to the cooling steam flow path 46 through one or more check valves 66. In the absence of steam being produced at a sufficiently high pressure or quality, such as during start-up of the plant 12, the compressed air 64 is directed through cooling passages 52 to provide the required degree of cooling. Once pressure in steam drum 40 is sufficiently high and steam admission valve 50 is opened, check valves 66 close to terminate the flow of compressed air 64.

Combined cycle power plants are designed to operate over a wide range of conditions, including changes in the atmosphere, the fuel supply, the degree of flow blockage in systems subjected to fowling, unplanned leakage flow rates, etc. Furthermore, design calculations are merely estimates of actual as-built and as-maintained plant configurations. Accordingly, prior art plants utilizing a steam admission valve 50 for controlling the rate of flow through a cooling steam flow path 46 are designed to operate at full power conditions with the steam admission valve 50 partially closed in order to develop the desired pressure drop 104. The pressure drop 104 is sufficiently large to provide margin for abnormal and degraded operating conditions and design uncertainties. However, the present inventors have recognized that the prior art control scheme has an adverse impact on the overall efficiency of the plant, and that there is an economic cost associated with such inefficiency.

The pressure developed in the intermediate pressure steam drum 40 represents energy produced in the plant 12. When steam is delivered through the cooling steam flow path 46 to the intermediate pressure turbine 44, there is a pressure drop across the cooling steam flow path 46. A higher pressure drop across the cooling steam flow path 46 will result in a higher required intermediate pressure steam drum 40 pressure to result in the same supply pressure to the intermediate pressure steam turbine 44. A higher intermediate pressure steam drum 40 pressure will result in a reduced steam flow production from the intermediate pressure steam drum 40, and thus less energy to be expended across the intermediate pressure steam turbine 44. Thus, pressure drop across steam admission valve 50 results in an energy loss in the plant 12 that is not available to generate electricity.

Figure 2:
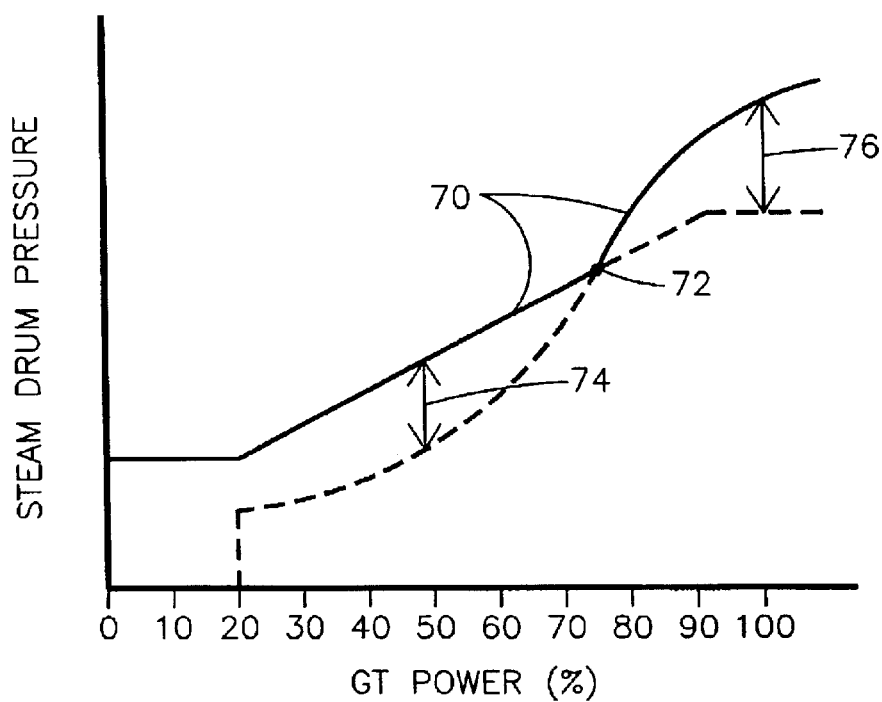
FIG. 2 illustrates the relationship of steam drum pressure and gas turbine power level.
Figure 3:
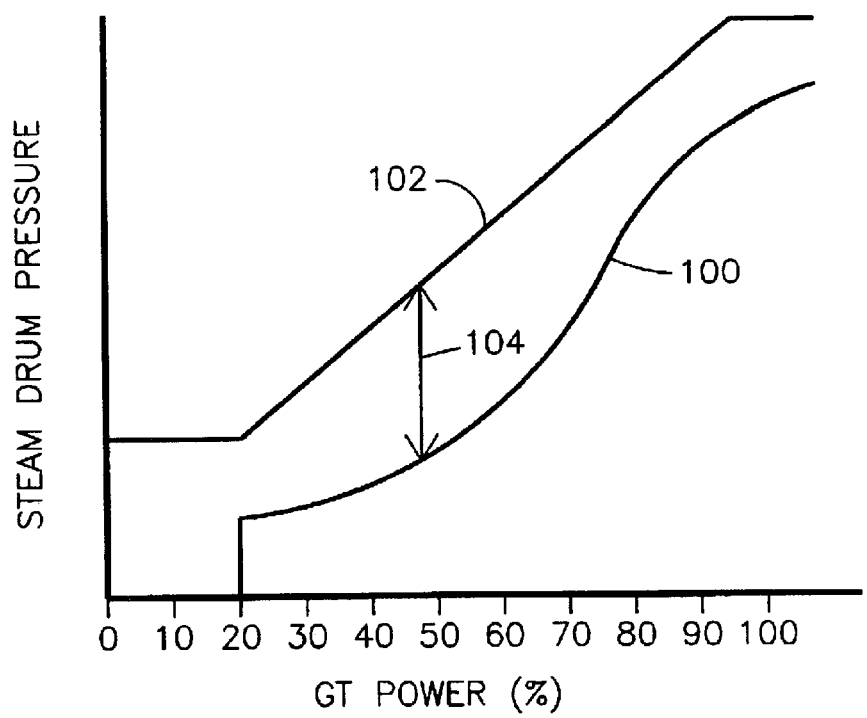
FIG. 3 illustrates the relationship of steam drum pressure and gas turbine power level in a prior art combined cycle power plant.
Figure 4:
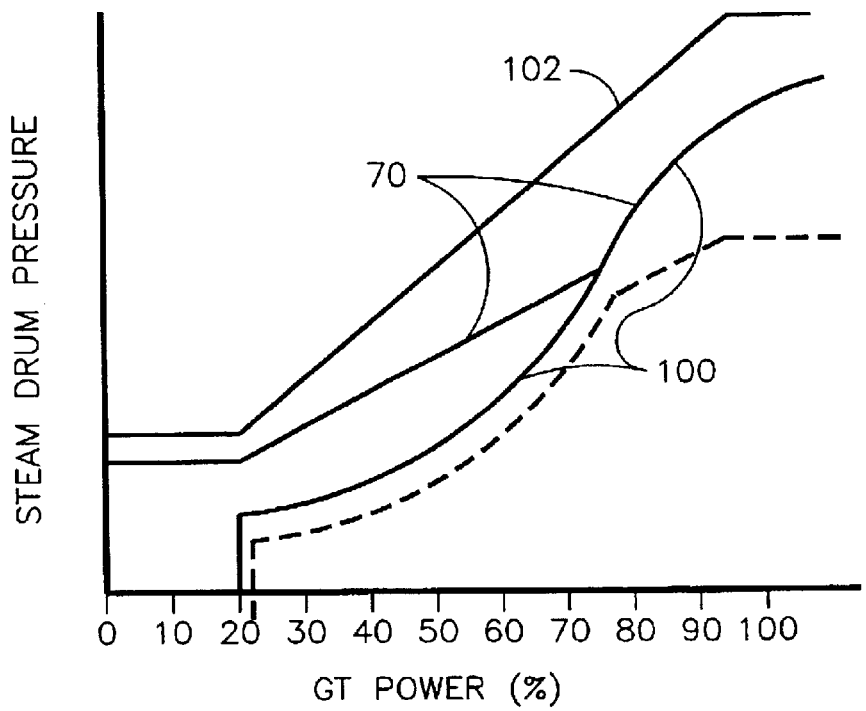
FIG. 4 illustrates the relationships of FIGS. 2 and 3 together.

The present inventors have developed an improved scheme for controlling the steam flow path 10 of combined cycle power plant 12 whereby the pressure loss across the steam admission valve 50 is minimized while the controllability of the system is preserved. This scheme is further explained with reference to FIG. 2 showing the relationship between gas turbine power level and steam drum pressure. Bypass valve pressure control curve 70 is illustrated as a solid line having an inflection point referred to herein as a crossover point 72. At power levels below the crossover point 72, the bypass valve pressure control curve 70 exceeds the pressure required to produce the desired amount of flow through cooling steam flow path 46 by a pressure difference 74. Notice that the dashed line at power levels below the crossover point 72 and the portion of curve 70 above crossover point 72 when viewed together correspond to the prior art cooling loop pressure demand curve 100 of FIG. 3. The steam admission valve 50 must be partially closed to produce pressure drop 74. However, at the crossover point 72 the pressure difference 74 goes to zero and the steam admission valve 50 is fully open. Further increases in the cooling steam flow for power levels above the crossover point 72 require a pressure increase in steam drum 40, as indicated by the portion of bypass valve pressure control curve 70 at power levels above the crossover point 72. Note that the dashed line in FIG. 2 at power levels above the crossover point 72 and those portions of curve 70 below the crossover point 72 when viewed together correspond to the prior art bypass valve pressure control curve 102 of FIG. 3, except that the curve has been lowered in pressure level along its full length, and the slope of the curve has been flattened somewhat. This may be appreciated more clearly by considering FIG. 4 wherein curves 70, 100 and 102 are illustrated together. In essence, by selecting a bypass valve pressure control curve that intersects the cooling loop demand pressure curve 100 at a power level less than 100%, the inventors have developed a control scheme wherein cooling steam flow rate is controlled in a low power mode (power levels below crossover point 72) by the steam admission valve 50 and in a high power mode (power levels above the crossover point 72) by the steam bypass valve 54. The steam bypass valve 54 is thus crossed over from a pressure control mode at low power levels to a flow control mode at high power levels. The advantages of such a scheme are improved plant efficiency at high power levels as a result of having the steam admission valve 50 fully open at power levels beyond the crossover point 72, and good system control at low power levels as a result of having independent control of steam drum pressure and cooling steam flow rate. In the embodiment of FIG. 4, the difference between curves 70 and 102 represents a plant efficiency increase across the entire load range.

Note that at power levels below the crossover point 72 there remains a loss of plant efficiency resulting from the pressure drop 74 developed across the steam admission valve 50. However, in most applications the overall efficiency of the plant at low power levels is of little concern. Also note that the steam drum pressure changes necessary for cooling steam flow rate at power levels above the crossover point 72 will still affect the water level in the steam drum 40. However, in this higher power range the steam drum power level is high enough to absorb such pressure/low/level transients without undue control difficulties.

The control logic used to implement the control scheme described above is essentially the same as the prior art scheme for power levels below the crossover point 72 with the exception that the control pressure values are set somewhat lower. At power levels beyond the crossover point 72, the flow controller for the cooling steam flow path 46 still calculates a required flow amount. However, that demand does not go the steam admission valve 50 since it is already 100% open, but rather, it goes to the controller for the bypass valve 54 as a flow compensator value corresponding to the pressure difference 76 shown in FIG. 2. The crossover of control for the bypass valve from pressure control mode to flow control mode may be made at any predetermined power level below 100% power, but not so low that the stability of the steam drum water level becomes a concern during transient conditions. The crossover of control of the steam bypass valve 54 from pressure control mode to flow control mode may be accomplished upon sensing the full open position of the steam admission valve 50. The example illustrated in FIG. 2 wherein the crossover point is about 70% power has been found to be useful in field tests of this invention. In other embodiments, the crossover point may be at least 70% power up to 100% power, about or at least 80% power, or about or at least 90% power. One may appreciate that in order to avoid cycling of the system at the crossover point 72 it may be necessary to incorporate a dead band around the crossover point 72 when switching from one mode to the other. In one embodiment, the crossover from pressure control mode to flow control mode occurs during power escalation at the crossover point 72, while the return from flow control mode to pressure control mode during power reduction is delayed until the actual flow through the cooling circuit exceeds the required flow by 10%.

The improved heat rate provided by the present invention has been found capable of saving about 2–4 btu/kwh in total plant efficiency.

While the preferred embodiments of the present invention have been shown and described herein, it will be obvious that such embodiments are provided by way of example only. Numerous variations, changes and substitutions will occur to those of skill in the art without departing from the invention herein. For example, this invention may be useful when supplying steam to a steam use location other than cooling passages in a gas turbine component, such as for providing process steam to an auxiliary plant. Accordingly, it is intended that the invention be limited only by the spirit and scope of the appended claims.

We claim as our invention:

1. A method for controlling steam flows in a combined cycle power plant having a heat recovery steam generator, an auxiliary steam circuit including a steam admission valve receiving a first flow of steam from a steam drum of the steam generator, and a steam bypass circuit including a steam bypass valve receiving a second flow of steam from the steam drum, the method comprising controlling pressure in and flow from the steam drum as a function of gas turbine power to a value that results in the steam admission valve being at least partially dosed at power levels below a crossover power level and that results in the steam admission valve being fully opened at power levels above the crossover power level, so that the steam bypass valve is crossed over from a pressure control mode at power levels below the crossover power level to a flow control mode at power levels above the crossover power level.

2. The method of claim 1, wherein the first flow of steam is directed to a component cooling passage, and further comprising selectively controlling the pressure in the steam drum at power levels above the crossover power level in response to a component cooling demand.

3. The method of claim 1, further comprising selecting the crossover power level to be at least 70% power.

4. A method of controlling delivery of steam from a steam drum of a heat recovery steam generator in a combined cycle power plant, the method comprising:
   providing a cooling steam flow path between the steam drum and a downstream location passing through a heat exchange passage, the cooling steam flow path comprising a steam admission valve;
   providing a steam bypass flow path between the steam drum and the downstream location not passing through the heat exchange passage, the steam bypass flow path comprising a steam bypass valve;
   controlling flow rate of steam through the cooling steam flow path by partially closing the steam admission valve at power levels below a crossover power level;
   maintaining the steam admission valve in a full open position at power levels above the crossover power level; and
   controlling flow rate of steam through the cooling steam flow path by selectively positioning the steam bypass valve at power levels above the crossover power level.

5. The method of claim 4, further comprising selecting the crossover power level to be about 70% power.

6. The method of claim 4, further comprising selecting the crossover power level to be at least 70% power.

7. The method of claim 4, further comprising forming the heat exchange passage through a portion of a gas turbine component of the combined cycle power plant.

8. A method for controlling steam flows in a combined cycle power plant comprising a heat recovery steam generator for generating steam, a component cooling circuit including a steam admission valve receiving a flow of cooling steam from the steam generator, and a steam bypass circuit including a steam bypass valve receiving a flow of bypass steam from the steam generator, the method comprising:
   selecting a cooling circuit demand pressure curve defining a relationship between power level and steam pressure in the steam generator necessary to produce a desired cooling steam flow rate in the component cooling circuit;
   selecting a steam bypass valve pressure curve that intersects the cooling circuit demand pressure curve at a crossover point below 100% power;
   controlling the steam admission valve in response to the cooling circuit demand pressure curve;
   controlling the steam bypass valve in response to the bypass valve pressure curve at power levels up to the crossover point, thus resulting in the steam admission valve being controlled to a full open position at the crossover point; and
   controlling the steam bypass valve in response to the cooling circuit demand pressure curve at power levels above the crossover point.

9. The method of claim 8, further comprising selecting the crossover point to be about 70% power.

10. The method of claim 8, further comprising selecting the crossover point to be at least 70% power.

11. A method for controlling steam flows in a combined cycle power plant comprising a heat recovery steam generator, a component cooling circuit including a steam admission valve receiving a flow of cooling steam from the steam generator, and a steam bypass circuit including a steam bypass valve receiving a flow of bypass steam from the steam generator, the method comprising:
   selecting a demand value for the steam bypass valve necessary to control steam pressure in the steam generator to a predetermined value as a function of power level;
   selecting a demand value for the steam admission valve necessary to provide a required cooling steam flow as a function of power level; and
   determining a flow compensator value for combination with the demand value for the steam bypass valve that results in a steam generator pressure sufficient to produce the required cooling steam flow with the steam admission valve fully open at and above a crossover point power level.

12. The method of claim 11, further comprising selecting the demand values for the steam bypass valve and for the steam admission to have the same value in order to position the steam admission valve in a full open position at the crossover point being between a 70–100% power level.

13. A method for controlling steam flows in a combined cycle power plant having a gas turbine, a heat recovery boiler, an auxiliary steam circuit including a steam admission control valve receiving a first flow of steam from the boiler, and a steam bypass circuit including a steam bypass control valve receiving a second flow of steam from the boiler, the method comprising:
   at power levels below a predetermined value below 100% power, controlling steam bypass control valve position to produce steam pressure in the boiler in excess of a pressure required to produce a desired steam flow value through the auxiliary steam circuit with the steam admission control valve fully open, and controlling steam admission control valve position to a partially dosed position to control steam flow through the auxiliary steam circuit to the desired value; and
   at power levels above the predetermined value, controlling steam bypass control valve position to produce steam pressure in the boiler to a pressure required to produce the desired steam flow value through the auxiliary steam circuit with the steam admission control valve fully open, and controlling steam bypass control valve position to a fully open position.

14. The method of claim 13, wherein the predetermined power level value is at least 70% power.

15. The method of claim 13, wherein the predetermined power level value is at least 80% power.

16. The method of claim 13, wherein the predetermined power level value is at least 90% power.

* * * * *